April 4, 1961  H. ALLEN  2,977,976
VALVE
Filed Oct. 7, 1958  3 Sheets-Sheet 1
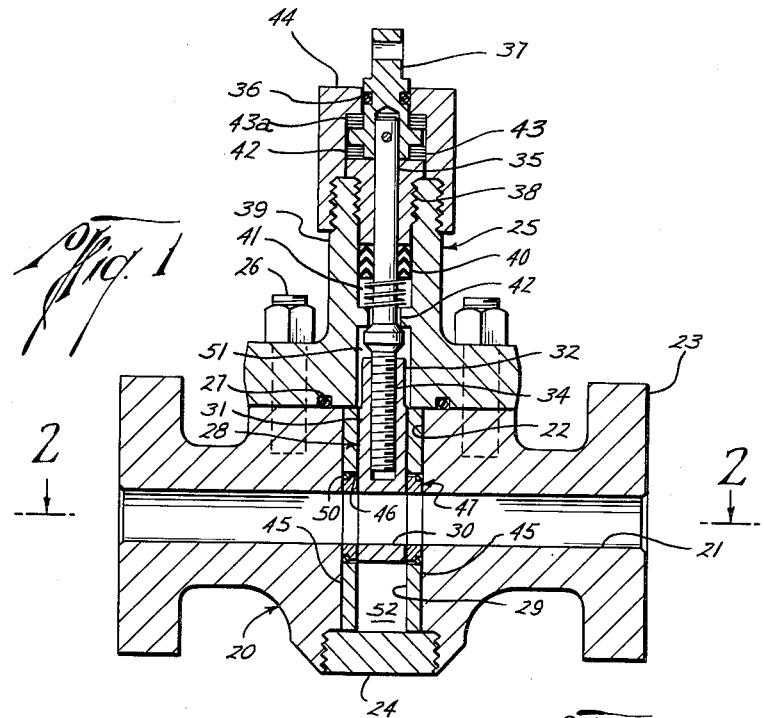
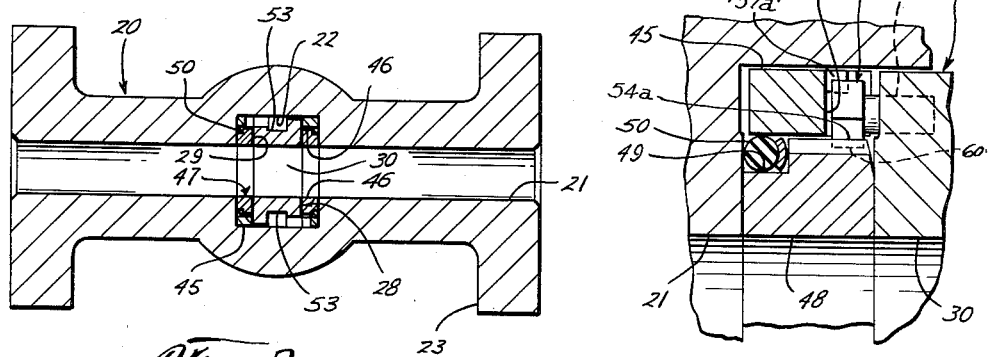
Herbert Allen
INVENTOR.
BY Browning, Simms, Hyer & Eickenroht
ATTORNEYS

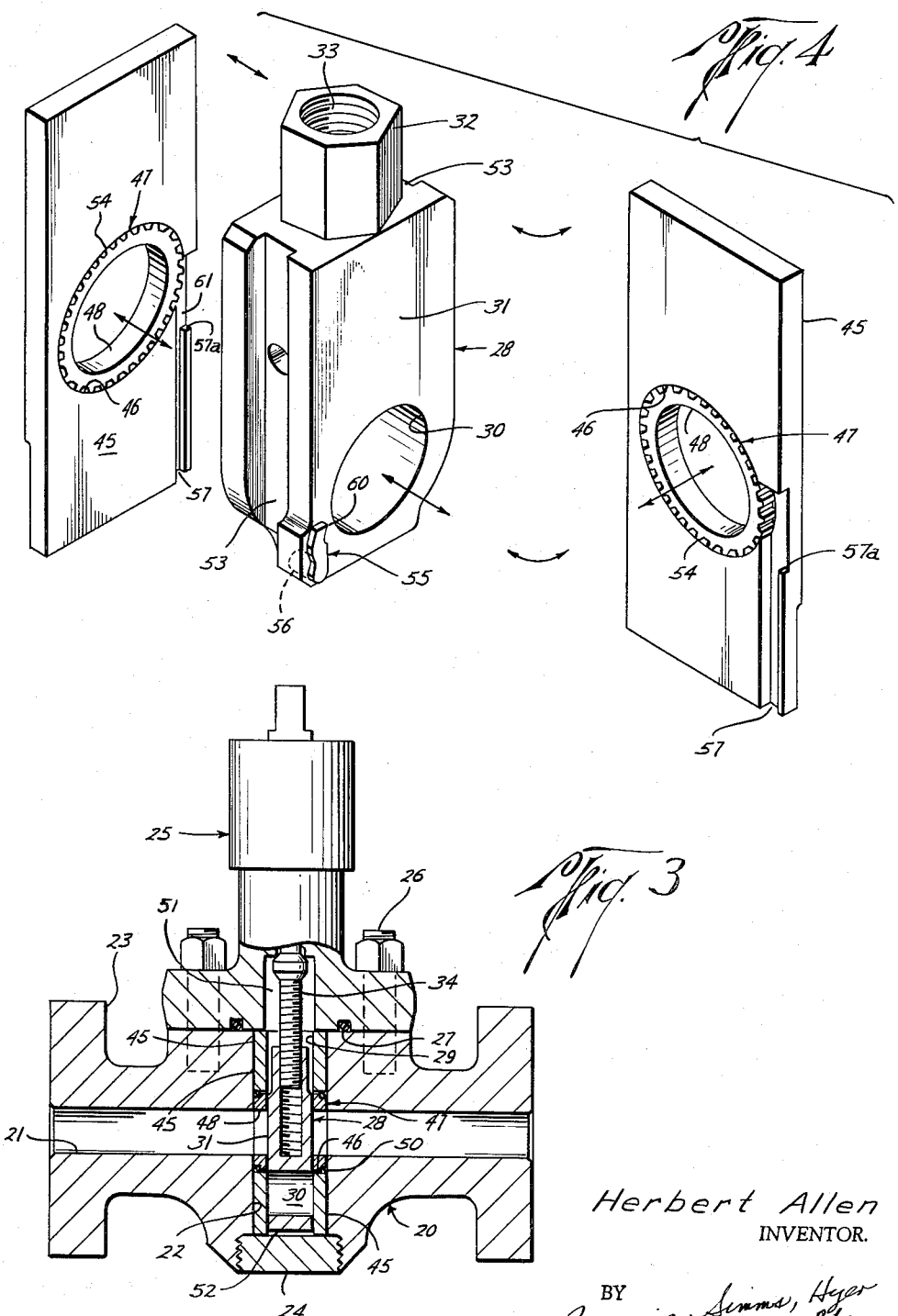

April 4, 1961

H. ALLEN 2,977,976

VALVE

Filed Oct. 7, 1958

Herbert Allen
INVENTOR.

BY Browning, Simms, Hyer & Eickenroht
ATTORNEYS

United States Patent Office 2,977,976
Patented Apr. 4, 1961

2,977,976
VALVE

Herbert Allen, Houston, Tex., assignor to Cameron Iron Works, Inc., Houston, Tex., a corporation of Texas Filed Oct. 7, 1958, Ser. No. 765,835

16 Claims. (Cl. 137—330)

This invention relates broadly to valves; and, more particularly, to improvements in valves of the type disclosed in my copending application, Serial No. 659,199, filed May 6, 1957, wherein a seat element is caused to rotate about its opening to distribute the wear about its edge.

In my earlier valve, rotation is imparted to the seat element by means which is responsive to opening and closing of the valve member and which includes parts dependent for their operation upon a frictional force-transmitting connection. When gritty substances are present in the fluid controlled by the valve, they may find their way between such parts so as to permit them to slip relative to one another and thereby fail to rotate the seat element.

An object of this invention is to provide a valve of this general type having a more positive means of rotating the seat element.

Another object is to provide such a valve having means for rotating the seat element which is not dependent upon a frictional force-transmitting connection between the operating parts thereof.

Still another object is to provide such a valve in which the seat element will fail to rotate only if one of the operating parts of the means for rotating it is sheared.

A further object is to provide a replaceable valve member and seat element assembly capable of accomplishing the foregoing objects which is simplified and compact in construction.

These and oher objects are accomplished by a valve which includes, as in the valve of my earlier invention, a body having a flowway therethrough and a cavity therein intersecting the flowway. A valve member is mounted on the body for movement within the cavity between flowway opening and closing positions, and a seat element having an opening therethrough is carried within the body for rotation about its opening to a plurality of rotational positions for sealing between the valve member in its closed position and a surface on the body which surounds the flowway at its intersection with the cavity.

In accordance with the present invention, the valve includes a part for engaging and following another part on the seat element, such as one of a plurality of teeth thereabout, for rotating the seat element from one rotational position to another in response to movement of the valve member between opened and closed positions. Thus, the seat element is rotated in a positive manner by means which is not dependent upon a frictional force-transmitting connection between the valve member and the seat element. That is, the rotation of the seat element would be prevented only by a force great enough to shear either the tooth or the aforementioned part engageable therewith.

More particularly, such means is continuous in operation in that the part is responsive to each cycle of opening and closing movement of the valve member to rotate the seat element from one rotational position to another and then return to a position for rotating the seat element from said other to still another rotational position upon a subsequent cycle. Preferably, the part rotates the tooth toward the end of the opening movement of the valve member so that there is a minimum of resistance to rotation of the seat element due to choking of the flowway.

In the preferred form of the invention, the part comprises a dog pivotally mounted on the valve member for guided movement into engagement with a tooth and swinging in a direction to follow the tooth as it rotates the seat element, toward the end of the opening movement of the valve member, and disengagement therefrom for swinging in the opposite direction and into the return position, during movement of the valve member into closed position. Thus, the dog is guidably received within a groove in the valve body which is relieved adjacent the seat element to permit the dog to swing in the one direction in following the first-mentioned tooth and then clear the successive tooth prior to swinging in the opposite direction toward the return position.

It is further contemplated that when, as in my previous invention, the seat element is carried by a plate removably disposable within the valve body cavity, the aforementioned groove will be formed within the retainer plate. It is still further contemplated that in a simplified form of the invention, and particularly in one having minimum space requirements, the teeth about the seat will extend outwardly from the periphery thereof and that the dog will be pivotally mounted for swinging about an axis parallel to the flowway of the valve body.

In the drawings, wherein like reference characters are used throughout to designate like parts:

Fig. 1 is a vertical sectional view of a gate valve constructed in accordance with the present invention and with the gate in open position;

Fig. 2 is a horizontal sectional view of the gate valve of Fig. 1, taken substantially along broken line 2—2 of Fig. 1;

Fig. 3 is a view similar to Fig. 1, but with the gate in closed position;

Fig. 4 is an enlarged exploded view of the removable gate and seat assembly of the valve of Figs. 1 to 3;

Figure 6:
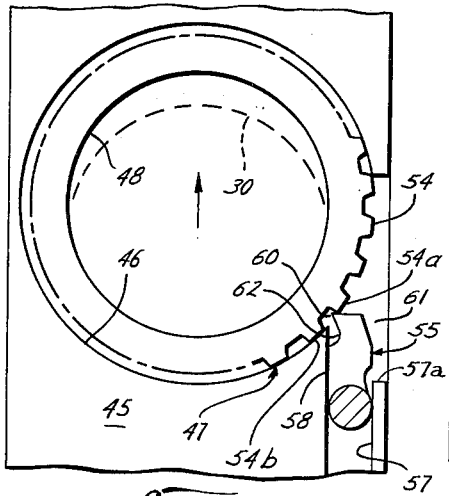
Figure 7:
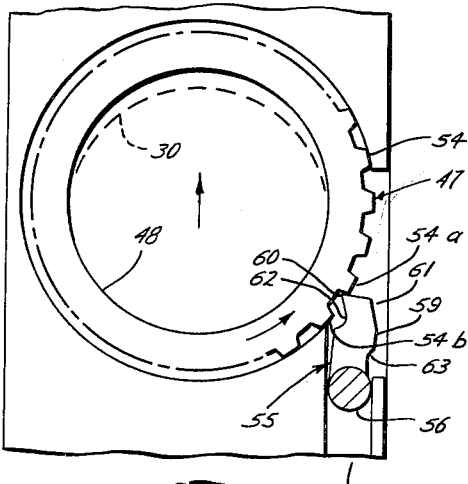
Figure 8:
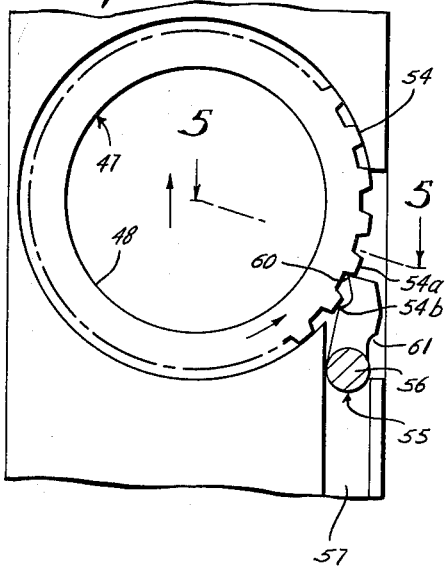

Fig. 5 is an enlarged detailed sectional view, taken substantially along broken line 5—5 of Fig. 8, showing the engagement of the dog on the gate with a tooth on the seat element; and Figs. 6 to 9 are elevational views, taken along the plane of the inner surface of one of the seat elements, and illustrating the sequential cooperation of the dog and teeth on the seat element during the final opening and initial closing movement of the gate.

Referring now more particularly to the above-described drawings, the gate valve shown in Figs. 1 to 3 includes a body 20 having a flowway 21 therethrough and a cavity 22 therein intersecting the flowway. The ends of the body 20 are provided with flanges 23 or other suitable means for connection in a pipe line. The cavity 22 is closed at its lower end by a plug or plate 24 and opens at its other end to one side of the valve body. This opening is covered by a bonnet 25 which is removably connected to the body by means of bolts 26 or the like and sealed with respect thereto by means of an O-ring 27.

As is customary in gate valves, the bonnet 25 supports a gate 28 for movement within a guideway 29 in the cavity 22 between the flowway opening position of Fig. 1 and the flowway closing position of Fig. 3. For this purpose, the gate 28 is provided with an opening 30 therethrough alignable with the flowway 21 in the open position of the gate, and a solid imperforate portion 31 which is disposable across the flowway as the opening 30 is moved out of alignment therewith upon movement of the gate to closed position.

As shown in Figs. 1, 3 and 4, the upper end of the gate 28 is provided with a collar 32 having an internally threaded opening 33 for connection to the lower threaded end 34 of a stem 35. The stem is pinned at its upper end to an extension 36 having a part 37 projecting outwardly from the top of the bonnet 25 to enable rotation of the stem. More particularly, the extension 36 is fixed against vertical movement within the bonnet so as to be non-rising and thereby cause the gate to move vertically within the guideway 29 in response to rotation of the stem and extension.

With particular reference to Fig. 1, the stem extension 36 is supported upon a bushing 38 threadedly received within the lower body portion 39 of the bonnet and resting upon a shoulder thereof. Packing 40 is received about the stem beneath the lower end of bushing 38 and urged into sealing engagement between the stem and body 39 by a compression spring 41 supported upon a reduced diameter portion 42 of the body. Bearings 43 and 43a are received about the stem extension above the bushing 38 and beneath the top of a cap 44 of the bonnet threadedly connected to the body portion 39 thereof. It is apparent from the foregoing that stem packing 40 may be replaced upon removal of the cap 44 and bushing 38.

Referring now to the replaceable gate and seat assembly, a pair of plates 45 are disposed within the body cavity 22 on opposite sides of the gate 28 so that their inner surfaces define the guideway 29 within which the gate is movable. Each such plate is provided with an opening 46 therethrough to receive an annular seat element 47, and each of the seat elements is, in turn, provided with an opening 48 therethrough for alignment with the flowway 21 through the valve body.

The outer surface of each seat element 47 is provided with a recess 49 (see Fig. 5) to receive an O-ring 50 for sealing engagement with a surface of the recess and the valve body which surrounds the intersection of the flowway 21 with an adjacent side of the cavity. More particularly, the seat element is slightly thicker than the retainer plate 45 in which it is carried, so that as the gate moves to the closed position of Fig. 3, upstream pressure will act against the solid imperforate portion 31 of the gate to urge it tightly against the seat element and the seat element tightly against the aforementioned surface on the downstream side of the body cavity. In this manner, the seat element seals between the downstream side of the gate and such surface.

The retainer plates are located by engagement at their upper ends with the lower side of bonnet 25 so as to align openings 48 with the flowway, as shown. Upon removal of the bonnet 25, the retainer plates may also be removed with the gate to permit replacement of the seat elements 47, if desired.

It is also apparent from Figs. 1 and 3 that the upper and lower ends of the gate 28 define chambers 51 and 52, respectively, within the valve body and bonnet for receiving grease or other lubricant to facilitate movement of the gate. As shown in Figs. 2 and 4, the opposite side edges of the gate are provided with grooves 53 for circulating the grease from one chamber to the other during reciprocation of the gate.

Turning now particularly to the novel features of the present invention, the outer periphery of each of the seat elements 47 is provided with a plurality of equally spaced apart, gear-like teeth 54 which have a relatively close sliding fit within the opening 46 in the retainer plates. As explained in my copending application, rotation of the seat element within this opening distributes the wear upon the lower inside edge of the downstream seat element and thereby prolongs its usable life. A dog 55 is carried on each side of the gate 28 adjacent opposite edges thereof for engagement with a tooth of the seat element carried by the adjacent retainer plate 45. More particularly, each of the dogs 55 is pivotally mounted adjacent a lower corner of the gate by means of pins 56 which permit the dog to swing about an axis parallel to the opening 30 through the gate and the flowway 21 through the valve body.

As best shown in Fig. 4, the inner surface of each of the retainer plates 45 is provided with a groove 57 which extends upwardly from the lower end of the plates to intersect the periphery of the seat element at its upper end. As shown in Figs. 6 to 9, the dog 55 is received within the groove 57 for guided movement into engagement with one of the teeth 54, during opening movement of the gate, and into a return position (not shown) in the lower end of the groove, during closing movement of the gate. During such guided movement, flat surfaces 58 and 59 on the inner and outer sides of the dog are slidable over adjacent sides of the groove 57 so as to maintain the dog in a substantially upright position.

In the latter position of the dog, the inner upper edge 60 thereof will move into engagement with a tooth 54a of the seat element toward the end of the opening movement of the gate, as illustrated by the relative position of opening 30 through the gate and opening 48 through the seat element shown in Fig. 6. As the gate continues to move upwardly during its final opening movement, the dog 55 will swing about the axis of pin 56 in a clockwise direction, as shown in Fig. 7, in order to follow the tooth 54a and thereby rotate the seat element in a counterclockwise direction. In order to permit this outward swinging of the dog 55, the groove 57 is relieved at 61 by the interruption at 57a of its upper right side.

As the gate continues to move upwardly from the position of Fig. 7 to that of Fig. 8 so as to fully open the flowway, the dog 55 will further rotate the seat element until it reaches the position shown in Fig. 8 wherein a succeeding tooth 54b of the seat element is disposed in a position for engagement by the edge 60 of the dog during a subsequent opening movement of the gate. That is, as shown in Fig. 8, the side edge of the tooth 54b is disposed outwardly of the upper projection of the inner side of groove 57 so that, upon return movement of the dog and subsequent upward movement thereof, the edge 60 of the dog will engage the tooth 54b for rotating it in the same manner as tooth 54a was rotated upon a subsequent cycle of opening and closing movement of the gate. Thus, it will be understood that the engagement of dog 55 with the seat element is so coordinated with the seat element as to rotate it through an angle at least approximately equal to that transcribed by each tooth.

Figure 9:
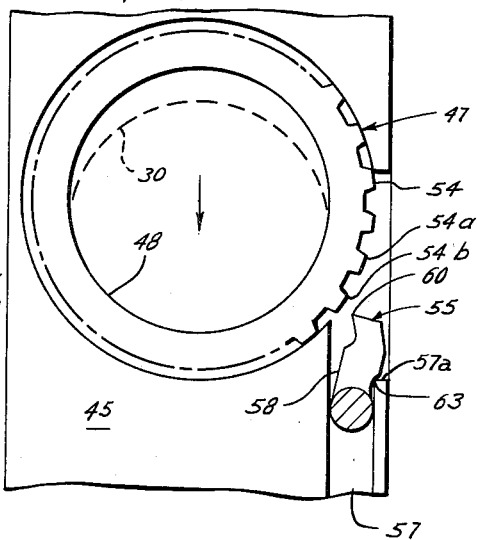

The inner side of the dog 55 intermediate the edge 60 and flat surface 58 thereof is recessed at 62 so that when the gate reaches the fully opened position of Fig. 8, the dog will clear the succeeding tooth 54b as it disengages from tooth 54a upon movement of the gate toward closed position. As shown in Fig. 9, when the inner side of the dog has cleared tooth 54b, the outer side thereof will engage the interruption 57a of the outer side of the groove 57 so as to swing the dog in a counterclockwise direction to an upright position in which the opposite surfaces 58 and 59 thereof will be disposed in position for guided movement in the groove 57. For this purpose, the outer side of the dog is curved at 63 to facilitate sliding over the interruption. Obviously, upon continued downward movement of the gate from the position of Fig. 9, the dog will be lowered to its return position for engagement with the tooth 54b upon subsequent opening movement of the gate.

As previously described, the dog engages and follows a tooth of the seat element so as to rotate the seat element toward the end of the opening movement of the gate. In this manner, there is a minimum of restriction of the flowway through the valve during rotation of the seat element, as can be seen from Figs. 6 and 7. Thus, there will be little or no resistance to turning of the seat element during this cycle of movement of the gate.

It is obvious that if sand or other gritty substance were to become clogged between the teeth of the seat element and the opening 46 in the retainer plate, the resistance provided thereby would have to be sufficient to shear either a tooth or the dog in order to prevent the seat element from rotating. Also, of course, the inner edge 60 of the dog would actually tend to remove such substance as it engaged with each tooth during operation of the gate.

It is further apparent that the provision of the teeth on the outer periphery of the seat element and the guided movement of the dog on the gate within the groove in the retainer plate for the seat element enables such retainer plates to be of minimum thickness. Furthermore, the disposal of seat elements and the parts for rotating same on both sides of the gate enables the gate to control flow in either direction since, in either case, it will cause the seat element on the downstream side of the gate to be rotated for distributing wear thereabout.

Although the illustrative embodiment of this invention is a gate valve, it is to be understood that its novel concepts are also applicable to other types of valves.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a body having a flowway therethrough and a cavity therein intersecting the flowway, a valve member mounted on the body for movement within the cavity between flowway opening and closing positions, a seat element having an opening therethrough and carried within the body for rotation about its opening to a plurality of rotational positions for seating between the valve member in its closed position and a surface on the body which surrounds the flowway at its intersection with the cavity, and a part on the valve member for directly engaging and following another part on the seat element to rotate the seat element from one predetermined seating position to another during movement of the valve member between opened and closed positions.

2. A valve, comprising a body having a flowway therethrough and a cavity therein intersecting the flowway, a valve member mounted on the body for movement within the cavity between flowway opening and closing positions, a seat element having an opening therethrough and carried within the body for rotation about its opening to a plurality of rotational positions for seating between the valve member in its closed position and a surface on the body which surrounds the flowway at its intersection with the cavity, and a part on the valve member to directly engage and follow another part on the seat element for rotating the seat element from one predetermined seating position to another during movement of the valve member between opened and closed positions and when the flowway is at least substantially open.

3. A valve, comprising a body having a flowway therethrough and a cavity therein intersecting the flowway, a valve member mounted on the body for movement in opposite directions within the cavity between flowway opening and closing positions, a seat element having an opening therethrough and carried within the body for rotation about its opening to a plurality of rotational positions for seating between the valve member in the closed position and a surface on the body which surrounds the flowway at its intersection with the cavity, teeth on the periphery of the seat element, a groove in the body, and a part on the valve member movable within the groove to engage and follow a tooth for rotating the seat element from one predetermined seating position to another, during movement of the valve member in one direction, and return to a position, during movement of the valve member in the opposite direction, for engaging and following a succeeding tooth to rotate the seat element from said other to still another predetermined seating position upon subsequent movement of the valve member in said one direction.

4. A valve, comprising a body having a flowway therethrough and a cavity therein intersecting the flowway, a valve member mounted on the body for movement in opposite directions between flowway opening and closing positions, a seat element having an opening therethrough and carried within the body for rotation about its opening to a plurality of rotational positions for seating between the valve member in the closed position and a surface on the body which surrounds the flowway at its intersection with the cavity, teeth about the seat element, and a part responsive to each cycle of opening and closing movement of the valve member for engaging and following a tooth to rotate the seat element from one predetermined seating position to another and then disengaging therefrom and returning to a position for engaging and following a succeeding tooth to rotate the seat element from said other to still another predetermined seating position upon a subsequent cycle of opening and closing movement of the valve member.

5. A valve, comprising a body having a flowway therethrough and a cavity therein intersecting the flowway, a valve member mounted on the body for movement in opposite directions within the cavity between flowway opening and closing positions, a seat element having an opening therethrough and carried within the body for rotation about its opening to a plurality of rotational positions for seating between the valve member in the closed position and a surface on the body which surrounds the flowway at its intersection with the cavity, teeth about the seat element, and a part on the valve member for engaging and following a tooth to rotate the seat element from one predetermined seating position to another, during movement of the valve member in one direction, and then disengaging therefrom and returning to a position, during movement of the valve member in the opposite direction, for engaging and following a succeeding tooth to rotate the seat element from said other to still another predetermined seating position upon subsequent movement of the valve member in said one direction.

6. A valve, comprising a body having a flowway therethrough and a cavity therein intersecting the flowway, a valve member mounted on the body for movement within the cavity between flowway opening and closing positions, a seat element having an opening therethrough and carried within the body for rotation about its opening to a plurality of rotational positions for seating between the valve member in its closed position and a surface on the body which surrounds the flowway at its intersection with the cavity, teeth about the seat element, and a part on the valve member to engage and follow a tooth for rotating the seat element from one predetermined seating position to another, toward the end of the opening movement of the valve member, and then disengage therefrom and return, during closing movement of the valve member, to a position for engaging and following a succeeding tooth to rotate the seat element from said other to still another predetermined seating position toward the end of a subsequent opening movement of the valve member.

7. A valve, comprising a body having a flowway therethrough and a cavity therein intersecting the flowway, a valve member mounted on the body for movement within the cavity between flowway opening and closing positions, a seat element having an opening therethrough and carried within the body for rotation about its opening to a plurality of rotational positions for seating between the valve member in its closed position and a surface on the body which surrounds the flowway at its intersection with the cavity, a part carried by the valve member, and teeth about the seat element, one such tooth being disposed, in one predetermined seating position of the seat element, to be engaged and followed by the part, during each cycle of opening and closing movement of the valve member, to rotate the seat element to another predetermined seating position and dispose a succeeding tooth in position to be engaged and followed by the part to rotate the seat element to still another predetermined seating position during a subsequent cycle of opening and closing movement of the valve member.

8. A valve, comprising a body having a flowway therethrough and a cavity therein intersecting the flowway, a valve member mounted on the body for movement in opposite directions within the cavity between flowway opening and closing positions, a seat element having an opening therethrough and carried within the body for rotation about its opening to a plurality of rotational positions for seating between the valve member in its closed position and a surface on the body which surrounds the flowway at its intersection with the cavity, teeth about the seat element, a dog for engaging a tooth in response to movement of the valve member in one direction, and means mounting the dog for swinging in a direction to follow the tooth for rotating the seat element from one predetermined seating position to another, in response to continued movement of the valve member in the one direction, and then in a direction for return to a position, in response to movement of the valve member in the opposite direction, for engaging and following a succeeding tooth to rotate the seat element from said other to still another predetermined seating position upon subsequent movement of the valve member in said one direction.

9. A valve, comprising a body having a flowway therethrough and a cavity therein intersecting the flowway, a valve member mounted on the body for movement in opposite directions within the cavity between flowway opening and closing positions, a seat element having an opening therethrough and carried within the body for rotation about its opening to a plurality of rotational positions for seating between the valve member in its closed position and a surface on the body which surrounds the flowway at its intersection with the cavity, teeth about the seat element, a dog, means mounting the dog for guided movement within the body, in response to movement of the valve member in one direction, to engage and swing in a direction to follow a tooth for rotating the seat element from one predetermined seating position to another, and, in response to movement of the valve member in the opposite direction, to disengage therefrom and swing in a direction for returning to a position to engage and follow a succeeding tooth to rotate the seat element from said other to still another predetermined seating position upon subsequent movement of the valve member in said one direction.

10. A valve, comprising a body having a flowway therethrough and a cavity therein intersecting the flowway, a valve member mounted on the body for movement in opposite directions within the cavity between flowway opening and closing positions, a seat element having an opening therethrough and carried within the body for rotation about its opening to a plurality of rotational positions for seating between the valve member in its closed position and a surface on the body which surrounds the flowway at its intersection with the cavity, teeth about the seat element, and a dog mounted on the valve member for engaging and swinging in a direction to follow a tooth to rotate the seat element from one predetermined seating position to another, toward the end of the opening movement of the valve member, and disengaging therefrom and swinging in an opposite direction to return, during closing movement of the valve member, to a position for engaging a succeeding tooth to rotate the seat element from said other to still another predetermined seating position upon subsequent opening movement of the valve member.

11. A valve, comprising a body having a flowway therethrough and a cavity therein intersecting the flowway, a valve member mounted on the body for movement within the cavity between flowway opening and closing positions, a seat element having an opening therethrough and carried within the body for rotation about its opening to a plurality of rotational positions for seating between the valve member in its closed position and a surface on the body which surrounds the flowway at its intersection with the cavity, teeth on the periphery of the seat element, a dog pivotally mounted on the valve member, and means for guiding the dog into engagement with one tooth and permitting it to swing in a direction to follow the tooth for rotating the seat element from one predetermined seating position to another, as the valve member moves into opened position, and then permitting the dog to clear a succeeding tooth and guiding it into a position, during closing movement of the valve member, from which it will be guided into engagement with a succeeding tooth to rotate the seat element from said other to still another predetermined seating position upon subsequent opening movement of the valve member.

12. A valve, comprising a body having a flowway therethrough and a cavity therein intersecting the flowway, a valve member mounted on the body for movement within the cavity between flowway opening and closing positions, a seat element having an opening therethrough and carried within the body for rotation about its opening to a plurality of rotational positions for seating between the valve member in its closed position and a surface on the body which surrounds the flowway at its intersection with the cavity, equally spaced apart teeth on the periphery of the seat element, a dog pivotally mounted on the valve member, and means including a groove in the valve body for guiding the dog into engagement with one tooth toward the end of its opening movement of the valve member and permitting it to swing in a direction to follow the one tooth for rotating the valve member from one predetermined seating position to another during the final opening movement thereof, said means also permitting the dog to disengage with the one tooth and clear a succeeding tooth during the initial closing movement of the valve member and then guiding the dog, upon further closing movement of the valve member, into a position from which it will be guided into engagement with said succeeding tooth to rotate the seat element from said other to still another predetermined seating position upon subsequent opening movement of the valve member.

13. A valve, comprising a body having a flowway therethrough and a cavity therein intersecting the flowway, a valve member mounted on the body for movement within the cavity between flowway opening and closing positions, a seat element having an opening therethrough and carried within the body for rotation about its opening to a plurality of rotational positions for seating between the valve member in its closed position and a surface on the body which surrounds the flowway at its intersection with the cavity, teeth equally spaced about the seat element, a dog pivotally mounted on the valve member, and a groove in the valve body for guiding the dog into engagement with a tooth, during opening movement of the valve member, and into a return position, during closing movement of the valve member, for engagement with a succeeding tooth upon subsequent movement of the valve member in said one direction, said groove being relieved to permit the dog to swing in a direction to follow the first-mentioned tooth for rotating the seat element from one predetermined seating position to another and disposing the succeeding tooth, during final opening movement of the valve member, in position for engagement by the dog, and then clear the succeeding tooth, during initial closing movement of the valve member, and said dog engaging the groove upon clearing the succeeding tooth for swinging, during continued closing movement of the valve member, into a position for guided movement within the groove into its return position.

14. A replaceable valve member and seat assembly, comprising a retainer plate having an opening therethrough, a seat element having an opening therethrough and received within the retainer plate opening, a valve member disposable on one side of the seat element and movable in opposite directions to open and close the opening through the seat element, teeth about the periphery of the seat element, a groove in the retainer plate, and a part on the valve member guidably movable within the groove to engage a tooth for rotating the seat element from one rotational position to another during movement of the valve member in one direction between opened and closed positions and then returnable during movement of the valve member in the opposite direction to a position for engaging a succeeding tooth upon subsequent movement of the valve member in said one direction.

15. A replaceable valve member and seat assembly, comprising a retainer plate having an opening therethrough, a seat element having an opening therethrough and received within the retainer plate opening, a valve member disposable on one side of the seat element and movable in opposite directions to open and close the opening through the seat element, equally spaced apart teeth on the periphery of the seat element, a groove in the retainer plate, and a dog pivotally mounted on the valve member and guidably movable within the groove into engagement with a tooth during movement of the valve member toward open position, said groove being relieved adjacent the seat element to permit the dog to swing in a direction to follow the tooth for rotating the seat element from one rotational position to another, during the final opening movement of the valve member, and clear a succeeding tooth to swing in the opposite direction, during movement of the valve member toward closed position, into a position within the groove from which it will engage with a succeeding tooth to rotate the seat element from said other to still another rotational position upon subsequent opening movement of the valve member.

16. A valve, comprising a body having a flowway therethrough, a valve member mounted on the body for opening and closing the flowway, operating means for moving the valve member between opened and closed positions, a seat element having an opening therethrough and carried within the body for seating in a plurality of rotational positions between the valve member in its closed position and the body about the flowway, teeth about the seat element, and a part for engaging and following a tooth on the seat element to rotate it from one predetermined seating position to another in response to actuation of the operating means.

References Cited in the file of this patent

UNITED STATES PATENTS

| | | |
|---|---|---|
| 851,161 | Churchill | Apr. 23, 1907 |
| 2,230,600 | Olson | Feb. 4, 1941 |
| 2,854,209 | Erwin | Sept. 30, 1958 |
| 2,907,342 | Berg | Oct. 6, 1959 |